(12) United States Patent
Noble (10) Patent No.: US 6,929,450 B2
(45) Date of Patent: Aug. 16, 2005

(54) TURBINE APPARATUS AND METHOD

(76) Inventor: James D. Noble, 2104 Rocky Creek La., Pearland, TX (US) 77581

( * ) Notice: Subject to any disclaimer, the term of this patent is extended or adjusted under 35 U.S.C. 154(b) by 123 days.

(21) Appl. No.: 10/683,057

(22) Filed: Oct. 10, 2003

(65) Prior Publication Data

US 2004/0265127 A1 Dec. 30, 2004

Related U.S. Application Data

(63) Continuation of application No. 10/217,722, filed on Aug. 13, 2002, now Pat. No. 6,682,302, which is a continuation-in-part of application No. 09/813,423, filed on Mar. 20, 2001, now abandoned.

(51) Int. Cl.$^7$ .............................................. F03D 7/06
(52) U.S. Cl. ........................ 416/1; 416/117; 416/143; 416/197 R; 415/4.2
(58) Field of Search ........................... 416/1, 9, 12, 17, 416/23, 24, 40, 41, 117, 142, 143, 197 R, 197 A; 415/2.1, 4.1, 4.2, 4.4, 907; 290/55

(56) References Cited

U.S. PATENT DOCUMENTS

| 713,094 A | 11/1902 | Grist |
| 1,915,689 A | 6/1933 | Moore |
| 2,314,612 A | 3/1943 | Duffy |
| 2,441,635 A | 5/1948 | Iverson |
| 3,897,117 A | 7/1975 | Katzer .......................... 308/3 |
| 4,015,911 A | 4/1977 | Darvishian .................. 416/119 |
| 4,097,190 A | 6/1978 | White ......................... 416/117 |
| 4,264,279 A | 4/1981 | Dereng ....................... 416/227 |
| 4,377,372 A | 3/1983 | Stutzman .................... 416/117 |
| 4,406,094 A | 9/1983 | Hempel et al. |
| 4,474,536 A | 10/1984 | Gougeon et al. ........... 416/226 |
| 4,515,525 A | 5/1985 | Doman ........................ 416/11 |
| 4,547,125 A * | 10/1985 | McMahon, II .............. 416/117 |
| 5,118,255 A | 6/1992 | Moreno ....................... 416/117 |
| 5,226,806 A | 7/1993 | Lubbers .................. 416/132 B |
| 5,375,968 A | 12/1994 | Kollitz et al. |
| 5,570,997 A | 11/1996 | Pratt |
| 5,823,749 A * | 10/1998 | Green ..................... 416/132 B |

FOREIGN PATENT DOCUMENTS

FR        2 783 881        3/2000

OTHER PUBLICATIONS

PCT/US03/25472 International Preliminary Examination Report Dated Sep. 15, 2004.
Krohn, Soren, Sep. 19, 2003 http://www.windpower.org/en/tour/wtrb/tower.htm, Accessed Nov. 2, 2004.

* cited by examiner

Primary Examiner—Edward K. Look
Assistant Examiner—Richard A. Edgar
(74) Attorney, Agent, or Firm—Trop, Pruner & Hu, P.C.

(57) ABSTRACT

A turbine system (10) for capturing energy from a fluid stream includes a torque arm (12). At least a pair of, preferably symmetrical clam shell, turbine blades (14) with the upper (16) and lower (18) halves are oppositely connected to the torque arm (12). A coordinating system (46) is connected to the symmetrical clam shell turbine blades (14). The coordinating system (46) further comprises a first system (48) and second system (52). The first system (48) is connected to control and regulate opening and closing of the upper (16) and lower (18) halves of each individual clam shell turbine blade (14). The second system (52) is connected between each pair of the symmetrical clam shell turbine blades (14) so that as one clam shell turbine blade (14) closes the opposite clam shell turbine blade (14) is forced open.

3 Claims, 8 Drawing Sheets

TURBINE APPARATUS AND METHOD

CROSS REFERENCE TO RELATED U.S. APPLICATION

This Patent Application is a continuation of U.S. patent application Ser. No. 10/217,722, filed Aug. 13, 2002 now U.S. Pat. No. 6,682,302, that Patent Application a Continuation-in-Part of U.S. Patent Application Ser. No. 09/813,423, filed Mar. 20, 2001 (now abandoned). Applicant hereby claims the benefit of each of the above-referenced Patent Applications and, by this reference, incorporates herein the entire disclosures of those Patent Applications.

TECHNICAL FIELD OF THE INVENTION

This invention relates to an improved turbine apparatus and method. In particular, this invention relates to a turbine apparatus for capturing energy from a fluid stream. Further, this invention relates to a wind turbine apparatus.

BACKGROUND OF THE INVENTION

A wide variety of turbine devices have been developed in order to remove energy from a flowing stream of fluid. Ancient watermills and windmills attest to man's age-old quest to ease the burdens of manual labor by wresting power from moving fluids. Man's attempt to obtain useful energy from wind and water has covered a wide spectrum of methods and applications. Historically, and by way of example only and not limitation, much of the progress has been made as a result of man's experience with sailing vessels. Early attempts to capture the wind's energy on land utilized sails made from fabric and stretched over some wooden framework to present a larger and lighter surface to react with moving air. Two basic wind turbine categories have evolved which classify all efforts to date for the recovery of power from moving fluids such as air.

The first, and older, category is one that features devices that simply occupy space in the wind stream and obtain energy by the impact of the air molecules on their surface. These are referred to as "drag" type devices. Drag is a force that results from the turbine blade's action to slow the wind by obstruction. Some of the kinetic energy that air molecules possess by virtue of having both a mass and a velocity is transferred to the wind turbine blade by means of a collision in which the air molecule is slowed and the turbine blade is accelerated.

Historically, drag type wind turbines have utilized some fixed configuration of turbine blade that presented two differing aspects to the wind stream depending on which orientation was presented to the wind. It is the differential value of the drag forces operating on the two differing configurations that is responsible for the torque moment or turning force of the turbine. In prior art drag type turbines, the drag force differential was small because the cross-sectional area presented to the wind was the same in both directions and only the configuration (concave or convex) varied much. Another typical characteristic of most drag type prior art devices is a shortened moment arm for each turbine blade. Rate of rotation has always been a prized value and extending the moment arm reduces this value as it increases torque.

One example of a common prior art drag type device is the anemometer used to measure wind velocity. In most anemometers, hollow hemispheres are mounted on spars that connect to a shaft which turns as the wind stream reacts with the hemispheres on each side of the axis of rotation. Due to their opposite orientation with respect to the wind stream, there is a differential between the drag force on one side and on the other, with respect to the shaft about which they are free to rotate. This drag differential results in a torque about the shaft and the cups rotate about the shaft due to this torque. Almost all drag type devices utilize a set configuration that seeks to optimize this drag differential by utilizing shapes which move freely through the wind in one direction, but which catch the wind when rotated in the air stream.

The second, newer, category of turbine devices includes those devices that rely on a "lift" force that is obtained by the wind's interaction with a particular form or shape inherent in the geometry of the sail or turbine blade. Lift is obtained when an airfoil, preferably a clean, i.e. structurally uninterrupted, airfoil, separates the wind stream into two portions which are forced to travel at differing velocities due to the shape of the foil. In the portion of the wind stream that is a accelerated relative to the portion that is slowed, a lower air pressure is induced. This lowered pressure on one side of the airfoil relative to the other results in a force normal (perpendicular) to the wind stream against the high-pressure side of the airfoil.

Since lift type turbine devices have the potential to extract a greater portion of the wind stream's energy by virtue of the fact that they don't require a collision of the air molecules with the surface of the sail or turbine blade, most recent attempts to design energy producing turbines have featured this principle. Due to the geometry of the manner in which lift force is induced in a lifting airfoil, current wind turbines typically rotate in a circular plane that is normal to the wind stream and rotate about an axis that is parallel to the wind stream. Because most airflow near the earth's surface is horizontal, this means that the plane of the wind turbine's rotation must be oriented in a vertical position and that the derived energy is produced at the end of a horizontal axis originating at the center of the wind turbine. Since the direction of the wind stream's flow is variable, the plane of this type of wind turbine's operation must also be variable to enable it to continually face into the wind.

Further, because the wind turbine's plane of rotation is vertical, it must be supported above the earth's surface by some sort of tower whose height is at least greater than the radius of the wind turbine's circular plane of rotation. Furthermore, this tower is constrained to be of a structural, vertical cantilevered design, since guy wires would interfere with the rotation of the wind turbine blades. Still further, since the wind turbine's circular plane of rotation is vertical and so is the tower that supports it, each must be offset from the other to prevent collision of the two. These turbines also create an eccentric load on the tower adding further complication to their design. In order to balance the eccentric load and to make efficient use of the energy available at the end of the horizontal shaft located at the top of the support tower, most present-day/prior art designs call for a power transmission and electric generator to be mounted at the top of the tower and at the opposite end of the horizontal drive shaft from the wind turbine. These designs result in significant weight which must be supported by the tower, kept in balance, and allowed to turn as the wind changes direction. Further, the tower must also be designed to resist the total overturning moment caused by the wind resistance of the wind turbine, the hub assembly and the tower itself. Not only does the tower have to resist these loads, but the tower foundation must eventually resolve such loads by transference into the surrounding ground. These requirements severely limit the altitude above the earth's surface that such wind turbines can be operated.

Another major limitation of present-day turbine technology is the required configuration of the individual turbine blades. Such blades are airfoils that obtain lift by virtue of their shape as the wind passes around them. The optimum shape requires a long blade length, but a short blade cross-section. This high L/D ratio in conjunction with a requirement to maintain low mass (weight) needed for maximum acceleration sets conflicting limits on the design of the wind turbine itself. Current optimizations of these conflicting variables result in blade configurations that are at or near critical values in each category of variable and severely limit the range of operating environment that current turbines may safely experience. That is to say, modern wind turbine systems are rigged to monitor for environmental variables such as gusting, wind direction, wind velocity and wind shear (among others) and are set to feather or stop operation altogether should any of these variables exceed the design range of operation.

The prior art is replete with references to patents for both drag and lift type devices. Three such patents are representative. U.S. Pat. No. 4,264,279 describes a lift type turbine. Although this is a lift type design, it utilizes airfoils mounted horizontally on a vertical axis. Apparently, it operates as does an autogyro since it cites a self starting feature. U.S. Pat. No. 4,377,372 is illustrative of the drag type patents of the prior art. This device uses flat plates that are hinged in the middle to alter profiles presented to the wind. The hinged plates open by gravity and are closed by the force of wind alone. U.S. Pat. No. 5,823,749 is also for a drag type device. This device utilizes fabric vanes because of weight considerations, thereby making it inappropriate for high wind velocity environments. Nonetheless, the invention shows an improvement whereby opposing vanes are linked by cords. Thus, when one vane is opened by gravity, the attached cord pulls the opposite vane closed.

In summary, drawbacks to the turbines known in the art, and in particular to wind turbines known in the art, include the necessity for lightweight, and therefor fragile, construction and the resultant inability to take advantage of the vastly more productive high wind velocity environments. Further, except for rudimentary string/cord devices, no coordination between wind vanes exists so as to enable controlled opening and closing of vanes in all wind conditions and no coordination of the multiple wind vanes is provided at all. Still further, prior art devices must be stopped when winds exceed design limits or when gusty wind conditions exist.

Thus, there is a need in the art for providing a turbine capable of use in extreme conditions, ruggedly constructed, efficient and inexpensive in design, and wherein the individual turbine blades are connected to other turbine blades and their movements are coordinated. It, therefore, is an object of this invention to provide an improved turbine system for capturing energy from a fluid stream. In particular, it is an object of this invention to provide an improved wind turbine apparatus and method for operation in high air and gusty wind conditions.

SHORT STATEMENT OF THE INVENTION

Accordingly, the turbine apparatus for capturing energy from a fluid stream according to one embodiment of the present invention includes a torque arm. At least a pair of, preferably symmetrical clam shell, turbine blades with first and second halves are oppositely connected to the torque arm. A coordinating system is connected to the symmetrical clam shell turbine blades. The coordinating system includes a first system and a second system. The first system is connected so as to control the opening and closing of the first and second halves of each individual clam shell turbine blade. The second system is connected between each pair of the symmetrical clam shell turbine blades so as to close one turbine blade while opening the opposite turbine blade.

In a preferred embodiment, the symmetrical clam shell turbine blades are of a streamlined configuration so as to provide minimal resistance to movement through the fluid stream. In a still further embodiment, the streamlined configuration is in the form of a teardrop shape with a larger leading-edge and a tapered trailing edge. In another embodiment, an adjustable clam shell turbine blade regulating system is provided for regulating the operation of the coordinating system. In a still further embodiment, a rotational velocity governor is provided wherein the load imposed is matched to the requirements of the turbine apparatus so as to act as a governor to restrict turbine apparatus rotational velocity to an optimum range.

A method of capturing energy from a fluid stream with a turbine apparatus is also disclosed and claimed as more fully set forth hereafter.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

The preferred embodiment of the present invention is illustrated by way of example in FIGS. 1–7. With specific reference to FIG. 1, turbine apparatus 10 according to an embodiment of the present invention includes torque arm 12 and a pair of, preferably symmetrical clam shell, turbine blades 14. Turbine blades 14 include upper half 16 and lower half 18 which, when in the closed position, present a streamlined aerodynamic shape to the fluid. That is, the halves 16 and 18 are attached to the torque arm 12 on the inside of the halves such that the connections are covered with the aerodynamic shape when closed leaving the exterior free and unencumbered, as will be discussed more fully hereafter. Further, in a preferred embodiment, upper half 16 and lower half 18 of clam shell turbine blades 14 are symmetrical, each half mirroring the other.

Figure 1:
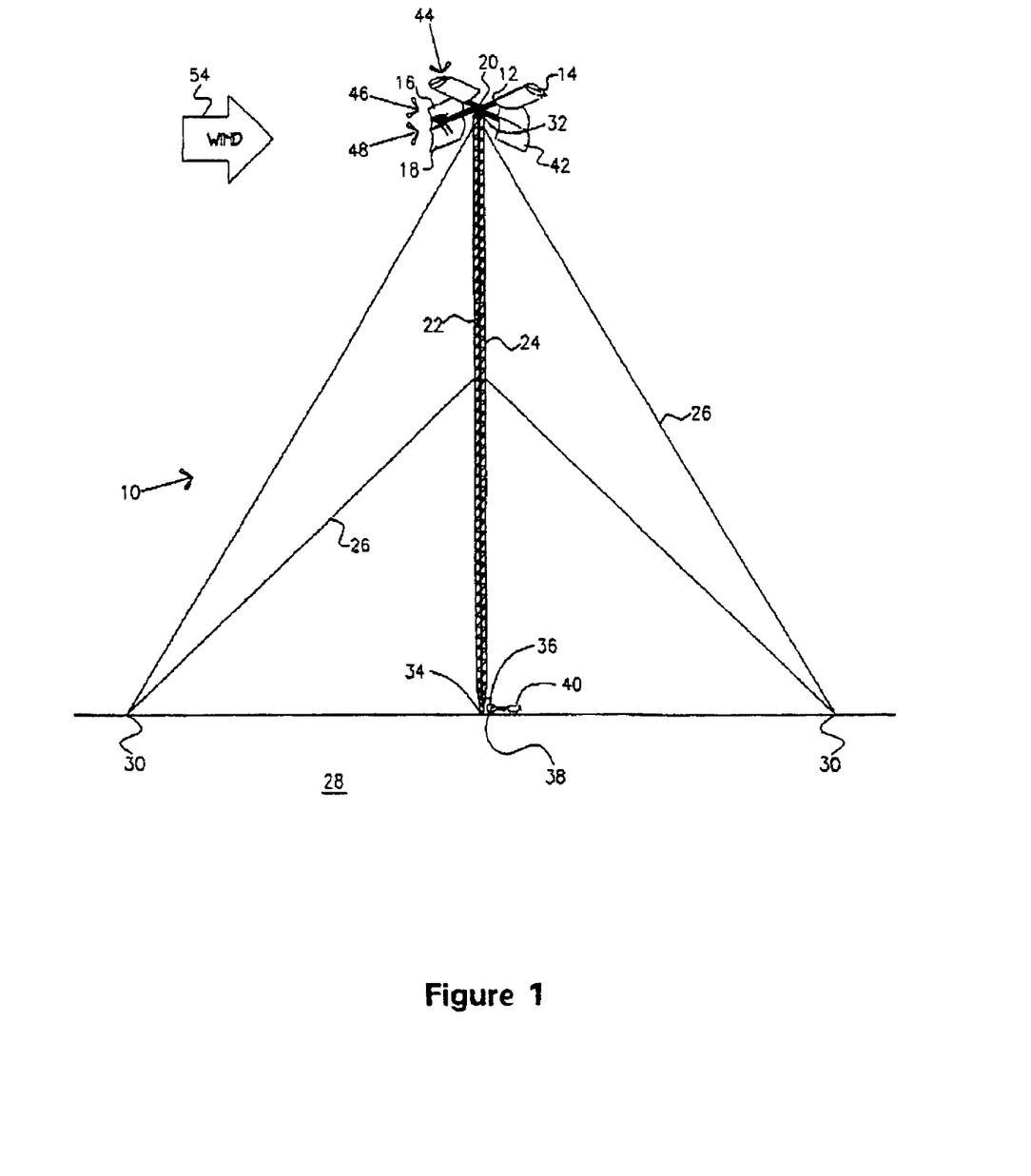
FIG. 1 is a perspective view according to a preferred embodiment of the turbine apparatus of the present invention.

As shown in FIG. 1, a pair of torque arms 12 support two pairs of oppositely positioned turbine blades 14, according to a preferred embodiment of the invention. Torque arms 12 are connected to rotor hub 20 at the center of the torque arm 12 and to vertical torque transmission drive shaft 22 by means of rotor hub 20. Drive shaft 22 is supported within open web truss tower 24. Tower 24 is supported by guy wires 26 and guy wires 26 are secured to the ground 28 by ground anchors 30.

Drive shaft 22 runs from the top 32 of tower 24 to the base 34 of tower 24. At the base 34, power take off 36 connects drive shaft 22 with driven device 38. According to an embodiment of the invention, driven device 38 is a positive displacement pump. According to another embodiment, driven device/positive displacement pump 38 is connected to manifold 40 for providing a constant output from the positive displacement pump.

FIG. 1 shows turbine blades 14 in the open position 42 and in the closed position 44. For each pair of turbine blades 14, one turbine blade is open and/or opening while the opposite turbine blade 14 is closed and/or closing.

Coordinating system 46 is also generally shown in FIG. 1 and will be disclosed more fully hereafter. According to an embodiment of the invention, coordinating system 46 includes a first system 48 for controlling the opening and closing motion of the upper half 16 and the lower half 18 of each turbine blade 14. According to one embodiment, the first system 48 includes a pair of linear bearings 50 connected to upper half 16 and lower half 18 of turbine blades 14 and to the torque arm 12 as will be more fully described with reference to FIGS. 2–5.

Coordinating system 46 includes a second system 52. Second system 52 connects oppositely positioned pairs of clam shell turbine blades 14 so that as one clam shell turbine blade 14 closes the opposite clam shell turbine blade 14 is opened. According to one embodiment of the invention, second system 52 includes a closed loop hydraulic system as more fully set forth hereafter with reference to FIG. 7.

According to a preferred embodiment, turbine apparatus 10 of the present invention is designed to operate above the ground effect turbulence that affects most prior art devices. In a preferred embodiment, turbine apparatus 10 of the present invention supports clam shell turbine blades 14 in high air more than 100 meters above ground 28.

Figure 2:
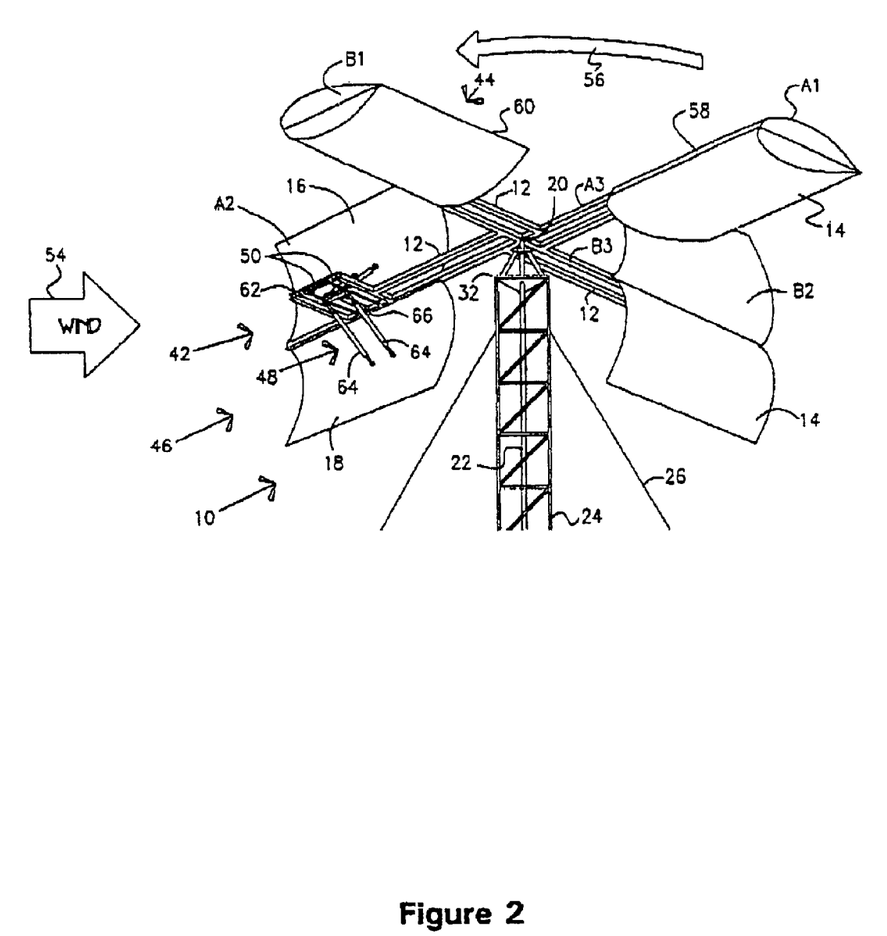
FIG. 2 is a side perspective close up view of the clam shell turbine blades according to an embodiment of the present invention showing two pairs of oppositely positioned turbine blades attached to two torque arms.

Referring now to FIG. 2, wind is shown coming from the left to the right by arrow 54. Turbine apparatus 10 is rotating in the direction of arrow 56. Two pairs of turbine blades 14 are shown with one pair each connected to a torque arm 12. Each separate turbine blade 14 is connected to the torque arm 12 opposite from another turbine blade 14. That is, turbine blade 14 pair A1–A2 is connected to torque arm 12 A3 while pair B1–B2 is connected to torque arm 12 B3. The turbine blades 14 moving into the wind or upwind are in the closed 44 position. These are turbine blades 14 A1 and B1. In this "upwind" configuration, clam shell turbine blades 14, since they are symmetrically formed, perfectly close together. That is to say, upper half 16 mirrors lower half 18. As a result, there are no overhangs or protuberances to create unnecessary drag in the upwind condition. In fact, in a preferred embodiment clam shell turbine blades 14 are of a streamlined configuration and have no exposed connections in the closed position 44 so as to provide minimal resistance to movement through a fluid stream, air or water, or the like. In a further preferred embodiment, the streamlined configuration is in an airfoil shape in the approximate form of a teardrop as illustrated in FIG. 2, where the clam shell turbine blades 14 are in the closed 44 position. This airfoil, teardrop shape includes a larger leading-edge 58 and a tapered trailing edge 60.

In accordance with an embodiment of the invention, when one of a pair of turbine blades 14 is in the closed 44 position, the opposite turbine blade 14 is in the open 42 position. As shown in FIG. 2, this means that when turbine blades 14 A1 and B1 are in the closed position 44 turbine blades 14 A2 and B2 are in the open 42 position.

Figure 3:
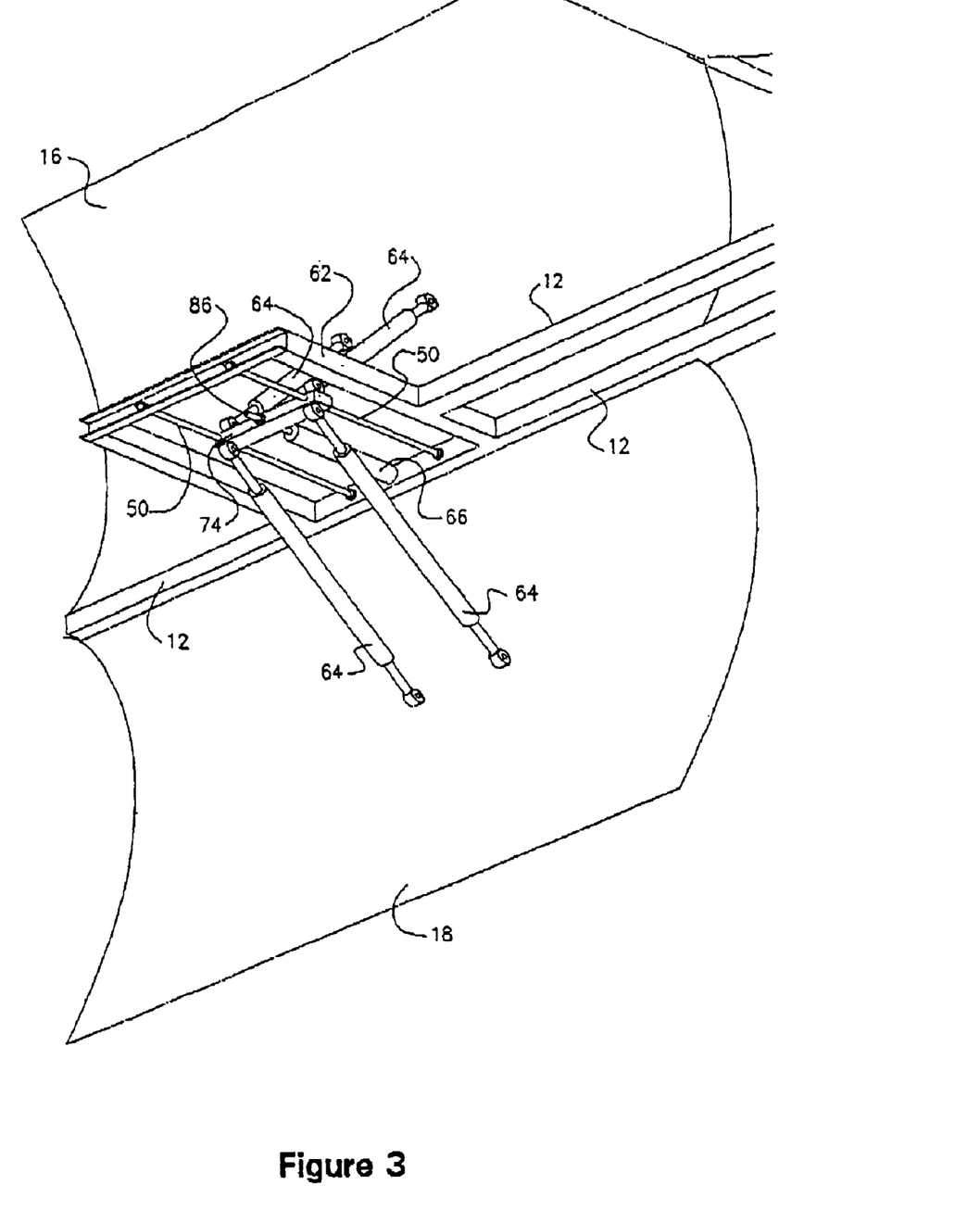
FIG. 3 is a perspective view of a single turbine blade.

More details of the coordinating system 46 are shown in FIG. 2 as well. First system 48 includes a pair of linear bearings 50 connected to linear motion bearing support 62. Linear motion bearing support 62 is connected to torque arm 12. A pair of control rods 64 are connected to each linear bearing 50 on one end and to the upper half 16 and lower half 18 on the other ends as illustrated. Second system 52 is also illustrated in part with regard to hydraulic cylinder 66. Second system 52 and hydraulic cylinder 66 are more fully described with regard to FIG. 7. FIG. 3 shows these elements in closer detail.

Figure 4A:
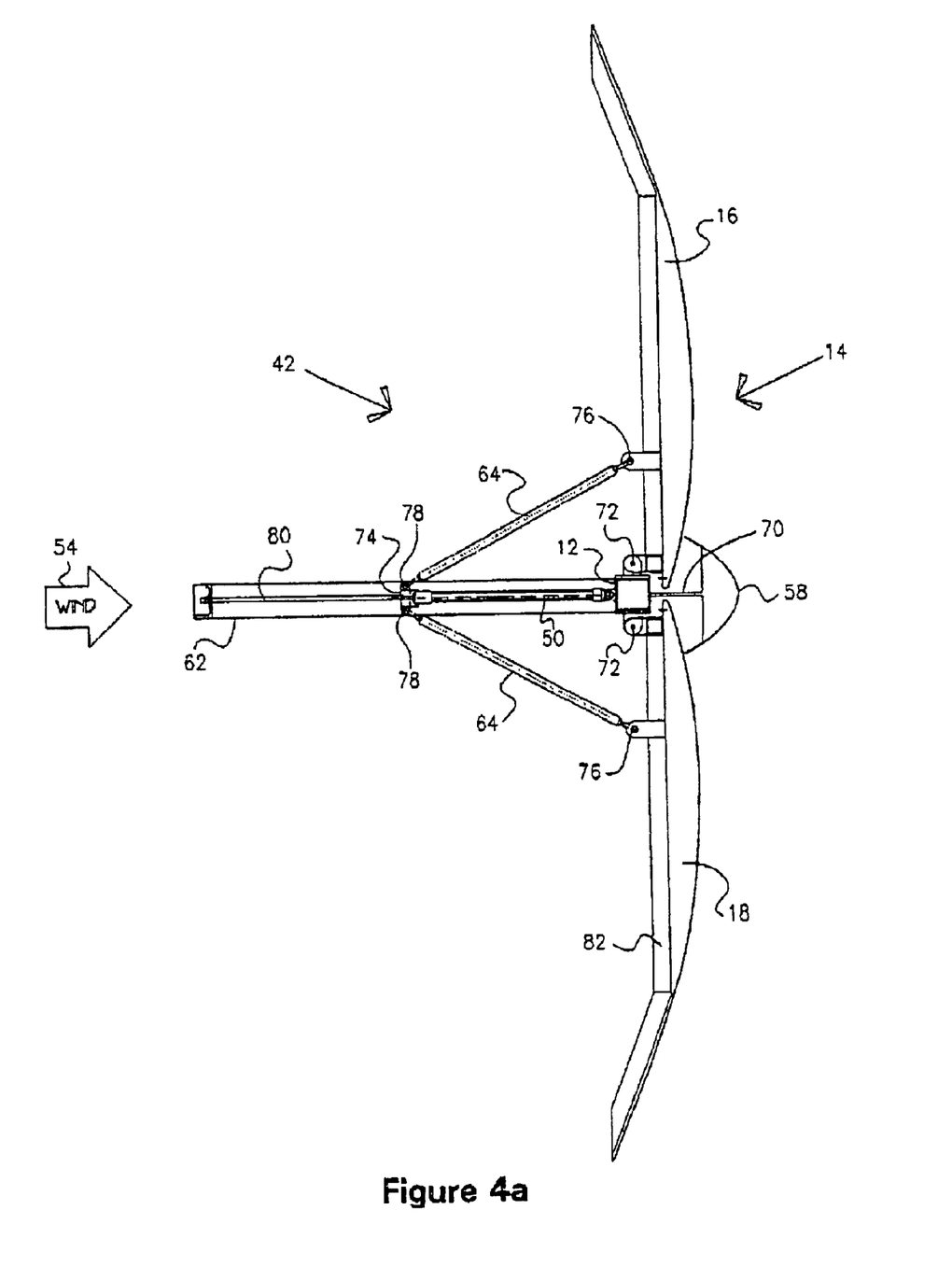
FIG. 4a is a side view of the clam shell turbine blade according to an embodiment of the present invention in the open position and FIG. 4b is a side view of the clam shell turbine blade of FIG. 4a showing the clam shell turbine blade in the closed position.
Figure 4B:
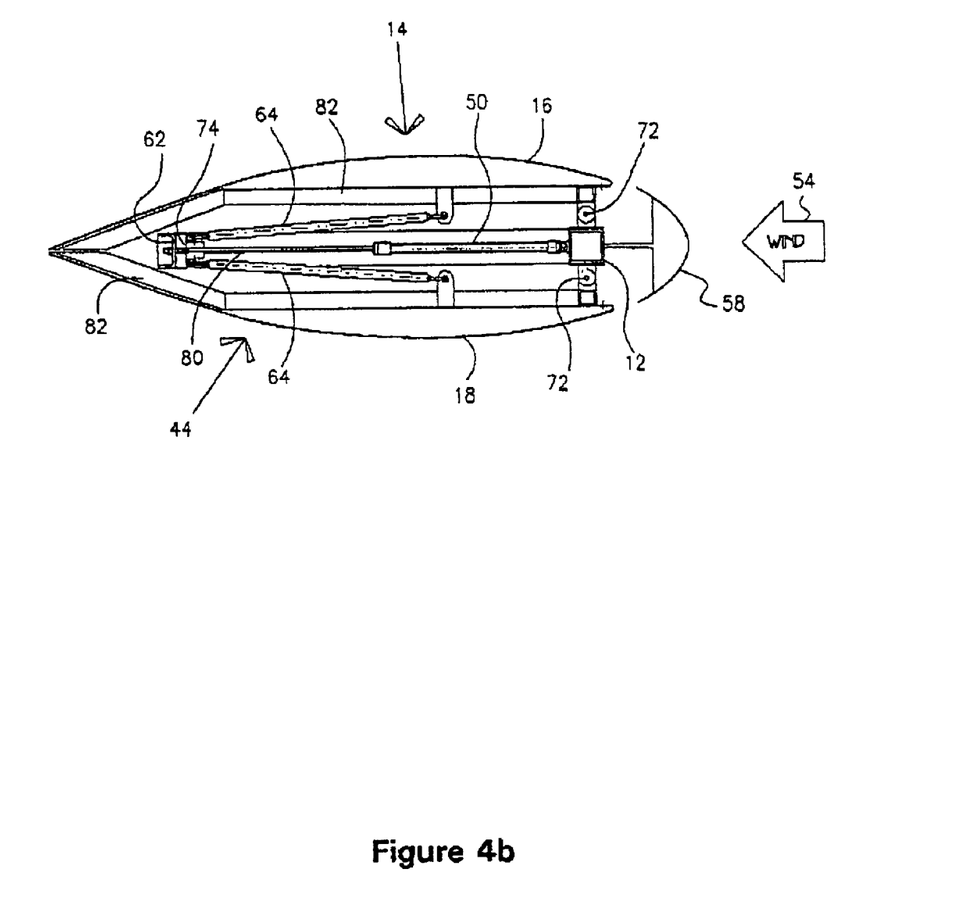

Referring now to FIGS. 4a and 4b, FIG. 4a shows a turbine blade 14 according to an embodiment of the invention in the open 42 position. Turbine blade 14 includes leading edge 58 connected to torque arm 12 by connection 70. In this open 42 position, leading edge 58 is downwind of the direction of the fluid, wind, moving from left to right in the direction of arrow 54. Upper half 16 and lower half 18 are shown connected by connections 72 to opposite sides of torque arm 12. According to one embodiment, connections 72 are moveable, rotatable, hinges.

Control rods 64 connect upper half 16 and lower half 18 to traveler 74. Hinged connections 76 attach control rods 64 to the turbine blade 14 and hinged connections 78 connect control rods 64 to traveler 74. As clearly shown in FIGS. 2 and 3, according to an embodiment of the invention, one pair of control rods 64 are attached as just described to each of the two linear bearings 50.

Figure 5:
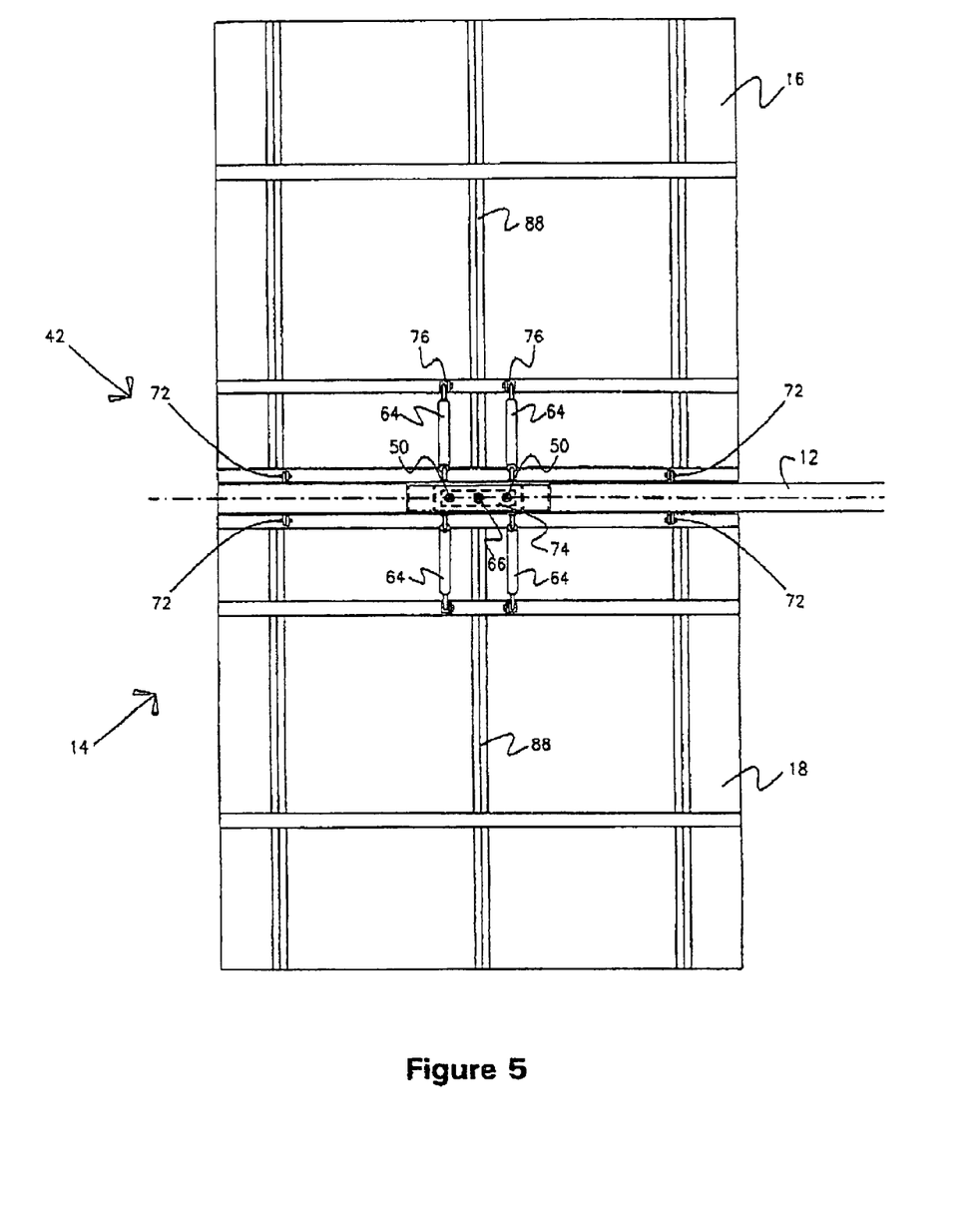
FIG. 5 is an elevation of the turbine blade mechanism looking downwind.

Linear bearing 50 is connected to torque arm 12. Linear bearing 50 is any linear bearing now known or hereafter developed. Traveler 74 is attached to linear motion bearing rods 80. Linear motion bearing rods 80 are connected to linear motion bearing support 62. According to one embodiment, as shown in FIG. 5, hydraulic cylinder 66 is connected to torque arm 12 between linear motion bearings 50. As more clearly shown in FIG. 7, hydraulic cylinder 66 includes casing 84 and extendable hydraulic rod 86. Traveler 74 is also connected to extendable hydraulic rod 86.

Structural frame 82 supports turbine blades 14 in their aerodynamic, air foil shape. As shown in FIG. 4a, the symmetrical halves 16 and 18 are in the open 42 position and catch fluid, wind, water and the like, moving from left to right in the direction of arrow 54. Again, as shown in FIGS. 1 and 2, when one turbine blade 14 of a pair of turbine blades is in the open 42 position the turbine blade 14 connected to the opposite end of a torque arm 12 is in the closed 44 position as shown in FIG. 4b.

According to a preferred embodiment, when turbine blades 14 are in the closed 44 position, no supporting structure is exposed to the fluid flow. With the fluid flow moving from right to left in the direction of arrow 54 in FIG. 4b, a smooth, uninterrupted aerodynamic surface is presented. This structure greatly reduces drag and enhances the efficiency of Applicant's turbine apparatus 10.

Figure 7:
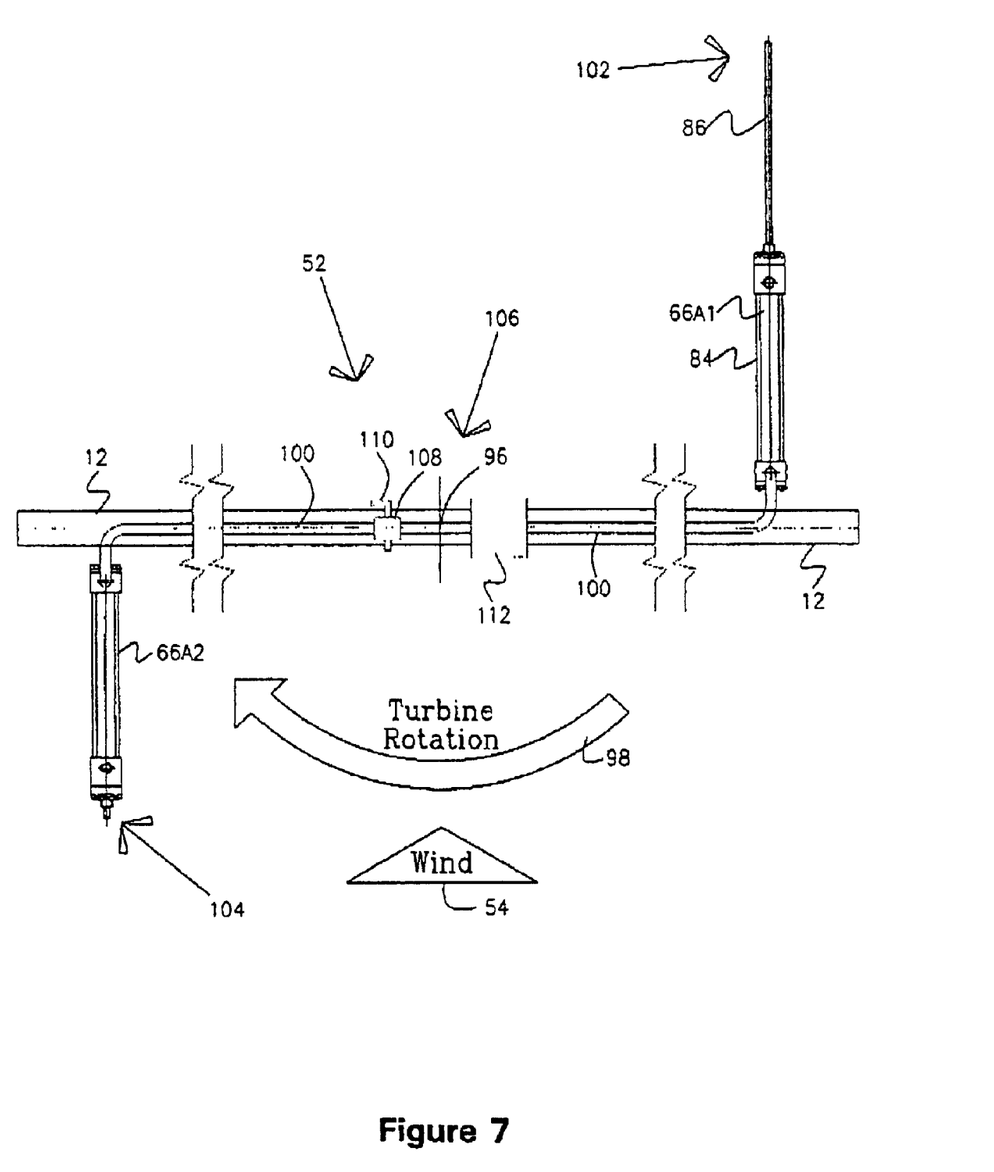
FIG. 7 is a cut away schematic of the closed loop hydraulic system according to an embodiment of the present invention.

FIG. 4b, and FIG. 7, illustrate the operation of first system 48 wherein extendable hydraulic rod 86 of hydraulic cylinder 66 has extended such that traveler 74 moves along linear motion bearing rods 80 drawing control rods 64 with it. Control rods 64 are folded inside the collapsed turbine blades 14. When in the closed 44 position, all the elements discussed with regard to FIG. 4a are covered by the turbine blade's 14 upper half 16 and lower half 18. First system 48 controls the movement of the upper and lower halves 16 and 18 such that they smoothly and accurately open and shut as the control rods 64 ride up and down the linear motion bearing rods 80 in unison with the traveler 74. While the speed of operation of turbine blades 14 may be controlled in other ways discussed more fully hereafter with regard to second system 52 and a rotational velocity governor, first system 48 is also controllable by varying the ease with which traveler 74 is free to move up and down linear motion bearing rods 80, for example only. Additionally, according to a preferred embodiment, the two pairs of control rods 64 effectively anchor the upper and lower halves 16 and 18 from any side to side and/or twisting motion in the fluid stream.

Referring now to FIG. 5, a view of a single turbine blade 14 shown in the open 42 position and looking down wind into the inside of the turbine blade 14 is shown. Here the layout according to an embodiment of the invention is shown wherein two pairs of control rods 64 are connected to two linear motion bearings 50 by means of traveler 74. The two linear motion bearings 50 are connected one on either side of the hydraulic cylinder 66. Also shown are reinforcing ribs 88 located on the inside of upper half 16 and lower half 18 such that when turbine blade 14 is in the closed 44 position, ribs 88 are not exposed to the fluid stream.

Figure 6:
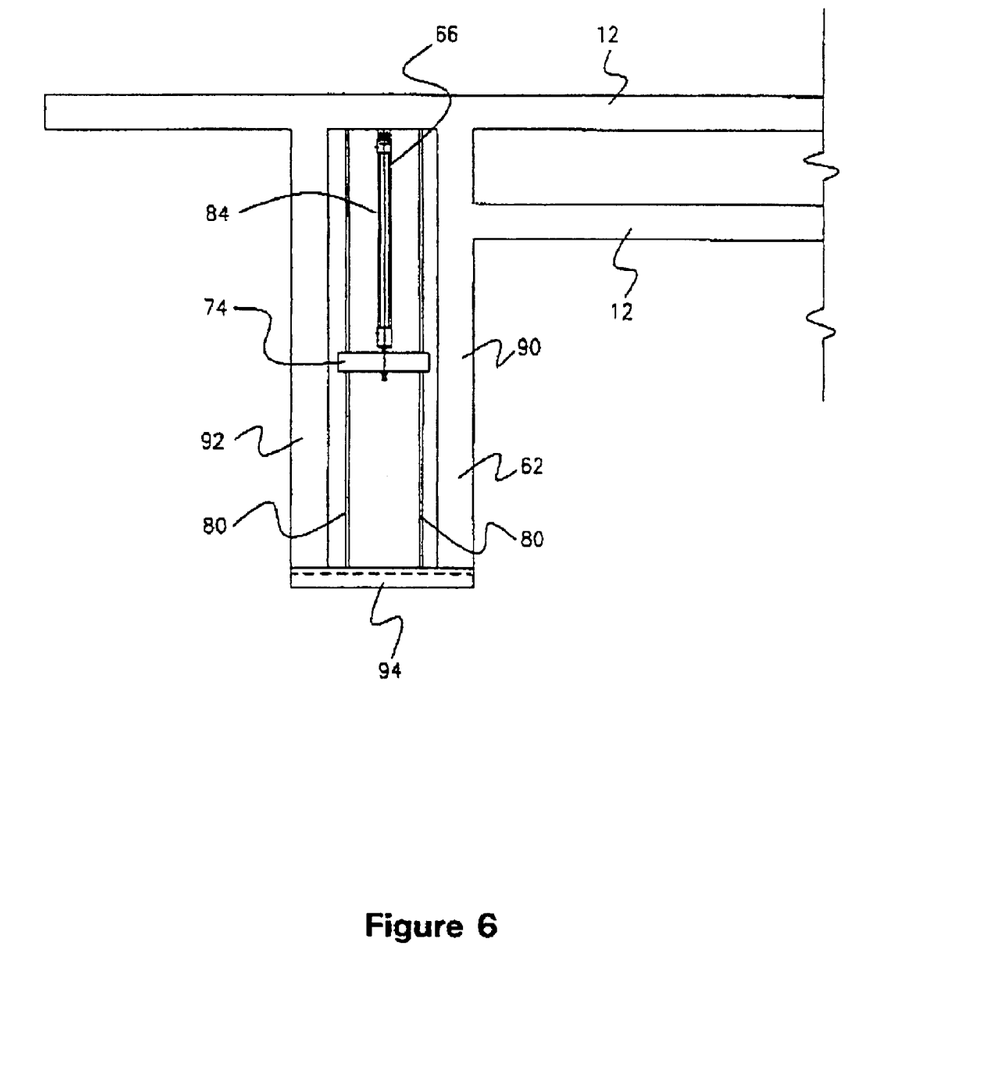
FIG. 6 is a top view of the torque arm with the turbine blade halves removed to show the linear bearings and the hydraulic cylinder according to an embodiment of the invention.

FIG. 6 is a top view of FIG. 5 with the turbine blade 14 and control rods 64 removed. Again, the layout according to an embodiment of the invention is shown including the linear motion support frame 62. As shown, support 62 is connected to torque arm 12 and the linear bearings 50 and the hydraulic cylinder 66 are located between the two arms 90 and 92 of support 62. Cap 94 of support 62 anchors the ends of linear motion bearing rods 80 as previously discussed.

Referring now to FIG. 7 second system 52 includes, according to an embodiment of the invention, a hydraulic cylinder 66 connected to opposite ends of a torque arm 12. Torque arm 12 rotates about the center of rotation 96 in the direction of arrow 98 with the wind from the direction of arrow 54, for purposes of example only. Each hydraulic cylinder 66 is connected as discussed above to torque arm 12 between upper half 16 and lower half 18 of turbine blade 14. Further, hydraulic line 100 connects hydraulic cylinder 66 A1 with hydraulic cylinder 66 A2. Hydraulic line 100 carries hydraulic fluid in a closed loop between hydraulic cylinder 66 A1 and hydraulic cylinder 66 A2.

FIG. 7 shows hydraulic cylinder 66 A1 with extendable hydraulic rod 86 in an extended position 102 and hydraulic cylinder 66 A2 with extendable hydraulic rod 86 in a retracted position 104. Because hydraulic line 100 forms a closed loop between hydraulic cylinders 66 A1 and A2, movement of one extendable hydraulic rod 86 causes movement of the other hydraulic rod 86. That is, moving extendable hydraulic rod 86 from the extended position 102 to the retracted position 104 at hydraulic cylinder 66 A1 causes extendable hydraulic rod 86 at hydraulic cylinder 66 A2 to move from the retracted position 104 to the extended position 102, and all positions in between. Since traveler 74 is connected to each extendable hydraulic rod 86 in a pair of turbine blades 14, turbine blades 14 are coordinated and controlled in opening and closing by means of coordinating system 46 including first system 48 and second system 52.

FIG. 7 also illustrates a regulating system 106. Regulating system 106 is connected to second system 52 so as to regulate the opening and closing of turbine blades 14. According to one embodiment, regulating system includes a manual valve 108. Manual valve 108, as illustrated, is connected to hydraulic line 100 and includes operating lever 110. By moving operating lever 110, as is known in the art, the flow of hydraulic fluid in hydraulic line 100 can be reduced or stopped altogether. Thus, regulating system 106 according to this embodiment enables a user to stop hydraulic fluid flow completely so as to freeze the turbine blades 14 against rotation while the turbine apparatus 10 is being installed on top of tower 24, for example only.

According to another embodiment, regulating system 106 includes a remotely operable valve 112. Remotely operable valve 112 may be any type of valve now known or hereafter developed including, for example only, an electronic solenoid valve. Remotely operable valve 112 may serve the same function as manual valve 108. Further, remotely operable valve 112 may serve as a rotational velocity governor as well. In this capacity, a user remotely operates valve 112 to reduce the flow of hydraulic fluid through hydraulic line 100 until the opening and closing of the turbine blades 14 is suited to the speed of fluid flow. For example, in high or gusty wind situations, remotely operable valve 112 enables a user to extend the time it takes to open and close the turbine blades 14 thereby effectively reducing the speed with which they rotate. The mechanisms for powering and operating the remotely operated valve 112 are well within ordinary skill levels for those in the art.

Referring again to FIG. 1, another rotational velocity governor according to an embodiment of the invention includes connecting power take off (PTO) 36 to the vertical torque transmission drive shaft 22. The user then selects an appropriately sized driven device 38 and connects it to the PTO 36. As used herein, an "appropriate size" means a size such that the load placed on the drive shaft 22 by the driven device 38 matches the load placed on the driven device 38 by the drive shaft 22. In this manner the rotational velocity of the turbine apparatus 10 may be controlled. An appropriate load is obtainable with minimal calculation by those of ordinary skill in the art so as to accommodate various fluid environments.

According to a further embodiment, the driven device 38 is a positive displacement pump for pumping water. In accordance with another embodiment, a manifold 40 is connected to the positive displacement pump for regulating the output of the pump so as to provide a constant input source to a power generating device (not shown).

By way of further explanation, as clam shell turbine blades 14 rotate into the wind, upper half 16 and lower half 18 are pressed together. Hydraulic fluid moves through hydraulic lines 100 so that one oppositely positioned clam shell turbine blade 14 is forced open while the other is pulled shut. Importantly, the closed loop hydraulic system buffers the opening and closing action of clam shell blades 14. That is, both when opening and closing, the process may be regulated as discussed above to move as quickly or as slowly as the operator desires. Certainly, the speed of operation is within the operator's control by any means now known or hereafter developed. For example, the speed of movement may also be regulated simply by selecting hydraulic fluids of varying viscosity.

According to a preferred embodiment, four turbine blades 14, as shown in FIG. 1, for example, are provided. In this embodiment, a hydraulic cylinder 66 is connected to each clam shell turbine blade 14, thereby providing two separate hydraulic lines 100 for coordinating and smoothly controlling the opening and closing of opposite sides of clam shell turbine blades 14. Again, second system 52 ensures that when one clam shell turbine blade 14 is fully open the other, directly oppositely positioned, clam shell turbine blade 14 is fully closed. Importantly, all the positions from fully closed to fully open are also controllingly coordinated by second system 52. That is, whatever percentage of completely open one clam shell turbine blade 14 may be in, the oppositely positioned clam shell turbine blade 14 is in the same percentage position of closure.

FIG. 1 also illustrates a preferred embodiment of the present invention wherein the clam shell turbine blades 14 are oppositely positioned on torque arms 12 and are symmetrically positioned around rotor hub 20. Further, it is clear from this illustration that in a preferred embodiment, clam shell turbine blades 14 are oriented in a horizontal plane and are symmetrically located about a vertical axis. This permits the use of a lightweight tower 24 with efficient guy wires 26 resisting the overturning moment induced by the wind. Since wind velocity tends to vary in horizontal strata near the earth's surface, turbine apparatus 10, located above the variable ground effect air, operates wholly within air at the optimum designed altitude.

By way of further explanation, power from turbine apparatus 10 is delivered as a torque moment about vertical drive shaft 28. This enables the force to be delivered at the base 34 of the tower 24 rather than at the top 32. In fact, any and all appropriate transmission gearing, generators, pumps, and compressors, may be located at the tower base 34 of Applicant's invention rather than aloft, further reducing the weight that must be supported by tower 24.

As previously discussed, a "rotational velocity governor" is provided by matching the load imposed on the turbine apparatus 10 to the requirements of the turbine apparatus 10. In high wind conditions, more load is applied, in low wind conditions, less load is required. Any means now known or hereafter developed for applying a variable load is appropriate for the purposes of the invention and is within the capabilities of those ordinarily skilled in the art. The point is that, since turbine apparatus 10 operates in response to wind impacting on the surface of turbine blades 14, the rotational velocity of the turbine blades 14 can have any value between zero and the current velocity of the wind or other motive fluid. It has been determined that optimum power is extracted when the velocity of the turbine apparatus 10/turbine blades 14 is held to a value that is equal to approximately one-third of the wind's velocity. While maximum starting torque is obtained with the turbine blades 14 at rest, no work can be done or energy extracted, unless there is movement. Therefor, by carefully engineering the area and extension of the turbine blades 14 and mating this to a properly fitted load, driven device 38 for example, whose power curve matches that of the turbine apparatus 10 design, the efficiency of the turbine apparatus 10 can be maintained at the optimum levels in all operating conditions such that the torque arm rotates within an optimum range.

In summary, the turbine apparatus 10 according to an embodiment of the present invention is a vertical axis turbine apparatus that utilizes articulated turbine blades 14, which operate in a horizontal plane, to optimize the differential in the drag force generated by the turbine blades 14 as they cycle from an upwind, collapsed and streamlined configuration, to a downwind, opened and cupped, configuration.

On the downwind power stroke, the turbine blade 14 is opened to present a maximum surface area for the wind to bear against, resulting in a torque force about a vertical axis. On the upwind stroke, turbine blade 14 is collapsed to its streamlined configuration providing lift and minimizing drag and its corresponding energy loss. In fact, Applicant's turbine apparatus combines the benefits of both "drag" and airfoil "lift" designs as discussed herein.

Further, the turbine apparatus 10 is symmetrical about a vertical axis and, preferably contains an even number of turbine blades 14 with each blade's gravity load balanced exactly by its opposite partner. It should be obvious, however, to those of ordinary skill that an uneven number of turbine blades could be accommodated by the invention as well.

Opposing turbine blades, clam shell blades, 14 are linked and regulated by a closed loop hydraulic system that ensures that while one is open the other must be collapsed. That is, the closed loop hydraulic system transfers a bidirectional force between the pairs of turbine blades 14 so that as one blade opens the other must collapse and vice versa. It is the differential force of the wind acting on the linked pair of turbine blades 14 that is responsible for activating the configuration change. This change is initiated during a period in the rotation of the turbine blades 14 while another fully open turbine blade 14 is producing the power stroke for that cycle and utilizes a different portion of the wind stream.

Further, Applicant's turbine apparatus 10 is inherently sensitive to wind direction change. It is the differential force of the wind acting on the two aspect configurations of the paired clam shell turbine blades 14 that is responsible for both the actuation of the configuration change and the force delivered to the vertical torque transmission drive shaft 28. A shift in wind direction simply causes the period of configuration change to vary in the affected turbine blade 14 pairs. Again, it should be noted that the portion of the wind stream that is responsible for effecting the opening and closing of the turbine blades 14 is distinct from that portion of the wind stream that actually imparts power to the opened turbine blades 14.

Still further, regulating system 106 is multifunctional in that, in addition to enabling configuration change and a response delay it in turn sets an upper limit on the rotational velocity of the turbine blades 14 for a corresponding wind velocity.

In a preferred embodiment, each clam shell turbine blade 14 is configured of two component halves 16 and 18, essentially identical, moveably connected/hinged at their leading-edge, operating in a clam shell mode and structurally supported by torque arm 12. Upper half 16 and lower half 18 are linked to each other and controlled by first system 48 in a manner that "balances" its operation against the pull of gravity with its partner. That is, as lower half 18 drops due to gravity's pull, the corresponding force is transferred to the top, upper half 16, to lift it. The only force required to manipulate the paired halves is that which is required to overcome system inertia and the frictional loss of the system. While the first system 48 controls the side to side and twisting movement of the halves, second system 52 and regulating system 106 cooperate to control and regulate turbine apparatus 10 against abrupt and damaging unregulated rapid movement.

While the preferred embodiment is directed to wind turbines, it should be obvious to one of ordinary skill in the art that the turbine can be used in any fluid, such as water. Turbine apparatus of Applicant's design can be anchored in the ocean and effectively capture energy from the Gulf stream, for example.

While the present invention has been disclosed in connection with the preferred embodiments thereof, it should be understood that there may be other embodiments which fall within the spirit and scope of the invention as defined by the following claims.

What is claimed is:

1. A turbine apparatus comprising:

a torque arm;

a first turbine blade disposed at a first end of the torque arm and comprising a first blade half and a second blade half, wherein the first and the second blade halves of the first turbine blade are conjoined to the torque arm;

a second turbine blade disposed at a second end of the torque arm and comprising a first blade half and a second blade half, wherein the first and the second blade halves of the second turbine blade are conjoined to the torque arm; and a coordinating system coupled to the first turbine blade and to the second turbine blade, the coordinating system to open the first turbine blade while concurrently closing the second turbine blade.

2. A turbine apparatus comprising:

a torque arm;

a first turbine blade disposed at a first end of the torque arm and comprising a first blade half and a second blade half, wherein the first and the second blade halves of the first turbine blade are conjoined to the torque arm;

a second turbine blade disposed at a second end of the torque arm and comprising a first blade half and a second blade half, wherein the first and the second blade halves of the second turbine blade are conjoined to the torque arm; and a coordinating system coupled to the first turbine blade and to the second turbine blade, the coordinating system comprising:

a first assembly attached to the first turbine blade;

a second assembly attached to the second turbine blade; and a coupler coupling the first assembly to the second assembly so that as the first assembly causes the first turbine blade to open, the second assembly causes the second turbine blade to close.

3. A turbine apparatus as defined in claim 2, wherein:

the first assembly comprises a hydraulic cylinder;

the second assembly comprises a hydraulic cylinder; and the coupler comprises a hydraulic line.

* * * * *